United States Patent [19]

Akimoto

[11] Patent Number: 4,627,297

[45] Date of Patent: Dec. 9, 1986

[54] APPARATUS FOR MEASURING THE MAGNITUDE OF A LOAD

[75] Inventor: Shigeyuki Akimoto, Tokyo, Japan

[73] Assignee: Copal Company Limited, Tokyo, Japan

[21] Appl. No.: 754,148

[22] Filed: Jul. 12, 1985

[30] Foreign Application Priority Data

Jul. 12, 1984 [JP] Japan ................................ 59-143217

[51] Int. Cl.⁴ ............................................. G01L 3/12
[52] U.S. Cl. ............................................... 73/862.34
[58] Field of Search ........................ 73/862.33, 862.34

[56] References Cited

U.S. PATENT DOCUMENTS

3,495,452  2/1970  Johnson, Jr. et al. .
3,564,909  2/1971  Foskett et al. .
4,520,681  6/1985  Moore et al. ..................... 73/862.34

Primary Examiner—Charles A. Ruehl
Attorney, Agent, or Firm—Staas & Halsey

[57] ABSTRACT

An apparatus for measuring the magnitude of a load connected to a drive shaft includes a pulse motor for intermittently driving the drive shaft into rotation in response to a motor drive signal of a changing level. A torsion bar rotatively displacable in dependence upon the magnitude of an applied load is connected between the motor drive shaft and a rotary shaft of an object constituting the load to be measured. Arranged on the side of the load is a sensor for sensing the rotational position of the rotary shaft via the torsion bar. The magnitude of the load is measured based on a difference in phase between the motor drive signal and a signal from the sensor indicative of the rotational position of the rotary shaft. The phase difference is measured by a counter when the motor is in the unloaded condition, and again when the load to be measured has been connected. The load torque is then calculated by using a prescribed equation involving the two measured phase differences.

6 Claims, 10 Drawing Figures

APPARATUS FOR MEASURING THE MAGNITUDE OF A LOAD

BACKGROUND OF THE INVENTION

1. Field of the Invention

This invention relates to a system for measuring the magnitude of a load connected to a drive shaft.

2. Description of the Prior Art

A conventional system for measuring the magnitude of a load connected to the drive shaft of a motor includes a torsion bar connected between the drive shaft and the driven rotary shaft of the load, and a pair of sensors, one of which is provided on the drive shaft-side of the torsion bar and the other of which is provided on the rotary shaft-side thereof, for sensing the rotational position of the shaft on each side. The magnitude of the applied load is measured based on the difference between the rotational positions of the shafts sensed by the respective sensors.

Figure 1:
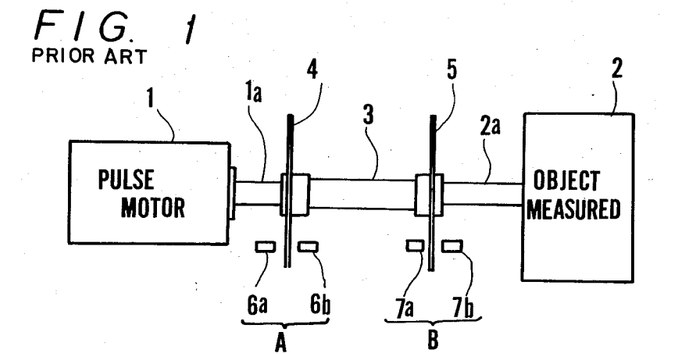
FIG. 1 is a view illustrating a torque measuring section of a conventional apparatus for measuring the magnitude of a load torque.

An example of the conventional apparatus for measuring the magnitude of the load is illustrated in FIG. 1. A pulse motor 1 rotates a drive shaft 1a on the driving side. A load 2 on the driven side is the object whose load is to be measured and has a rotary shaft 2a. A torsion bar 3 connects the shaft 1a with the shaft 2a. Discs 4 and 5, each having slits formed in the outer peripheral portion thereof, are fixed to the torsion bar 3 for co-rotation therewith. A sensor A comprises light-emitting and light-receiving elements 6a, 6b arranged to oppose each other across the disc 4. Similarly, a sensor B comprises light-emitting and light-receiving elements 7a, 7b arranged to oppose each other across the disc 5. The set-up is such that when a beam of light from the light-emitting element 6a impinges upon the light-receiving element 6b by passing through a slit in the disc 4, or when the light beam is interrupted by a non-transmissive portion of the disc, as the disc rotates, this is sensed by the sensor A which, in response, produces an output signal. In like manner, the sensor B produces an output signal as the disc 5 rotates. The load torque on the driven side is measured based on the phase difference between the two output signals.

With this conventional arrangement, sensing mechanisms must be provided on the active and passive sides, the amount of rotation on each side must be sensed, and a plurality of sensing points are essential. The result is a structure of some complexity. In addition, sensors on the active and passive sides must be corrected for any error in the rotation, and a great deal of time is consumed for such tasks as adjusting the positions at which the sensing mechanisms are mounted. U.S. Pat. No. 3,495,452 to Johnson, Jr. et al. and U.S. Pat. No. 3,564,909 to Foskett et. al. are inventions designed to arrange two discs in adjacent positions to simplify the adjustment of the positions of the sensing mechanisms. In these patents, two discs are provided, one on each end of the torsion bar, so the adjustment of the positions of the disc and the high cost entailed in the necessity to provide a plurality of the sensing mechanisms cannot be avoided.

SUMMARY OF THE INVENTION

An object of the present invention is to provide a load measuring system devoid of the aforementioned problems encountered in the prior art.

Another object of the present invention is to provide an apparatus for measuring, through a simple and readily adjustable structure, the magnitude of a load connected to the driven side of a drive shaft, by inclusion of only a single sensing means on the driven side of the drive shaft for sensing rotational position.

According to the present invention, the foregoing objects are attained by providing a load magnitude measurement system in which a motor for rotating a drive shaft is driven intermittently by a drive signal of a changing level. A member, such as a torsion bar, which is displacable in dependence upon the magnitude of an applied load is connected between the drive shaft of the motor and a rotary shaft of an object constituting the load. Arranged on the driven side, namely on the side of the load, is a sensing mechanism for sensing the rotational position of the rotary shaft. The magnitude of the load is measured based on a difference in phase between the motor drive signal and a signal from the sensing mechanism indicative of the rotational position of the rotary shaft. The phase difference is measured by counting means when the driven side is in the unloaded condition, and again when the load to be measured has been connected. The load torque is then calculated by using a prescribed equation involving the two measured phase differences.

According to the present invention, the magnitude of a load applied to a drive shaft can be measured based on a drive signal from a drive source and a detection signal from a device for sensing rotational position, with only one sensing device sufficing. This makes it unnecessary to correct for relative errors among plural sensing devices as in the prior art, simplifies positional adjustment when mounting the sensing device and enables measurement with little error. It is thus possible to obtain a load measurement system which is highly reliable, structurally simple and low in cost.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 2:
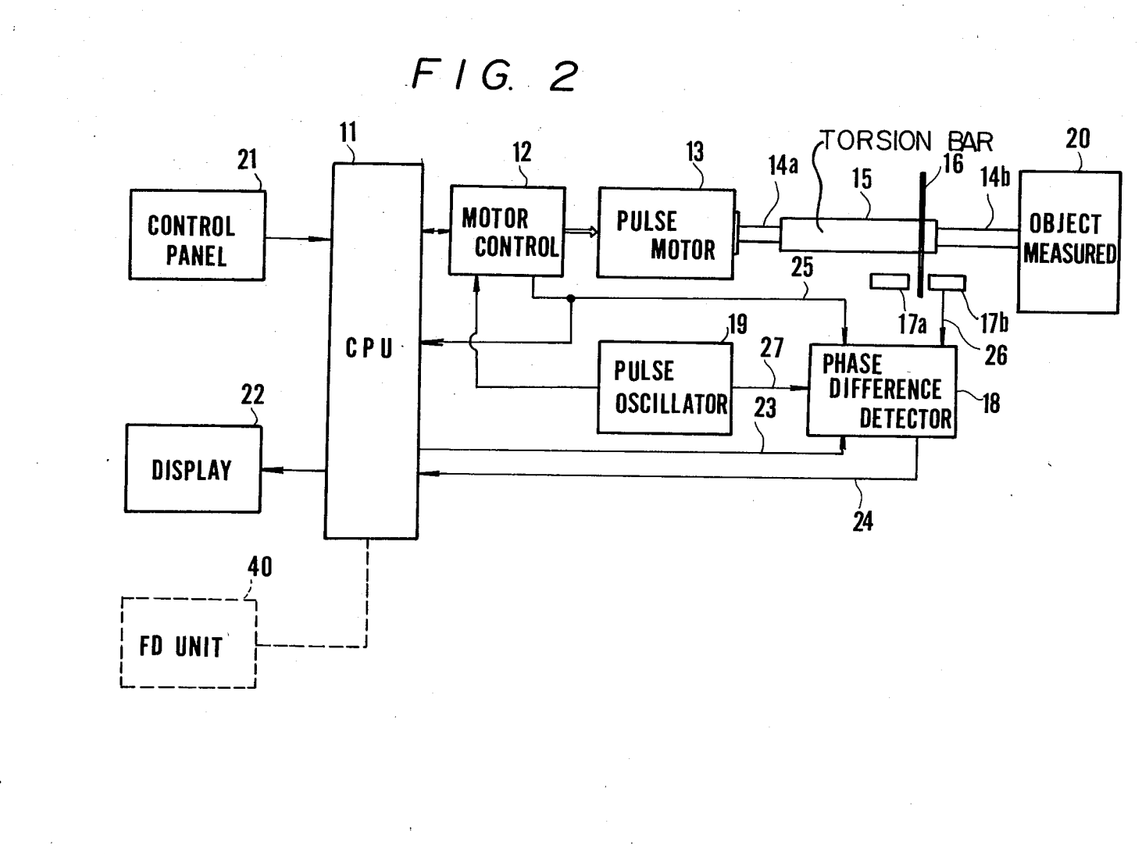
FIG. 2 is a block diagram illustrating a preferred embodiment of an apparatus for measuring the magnitude of a load torque according to the present invention.

A preferred embodiment of the present invention will now be described with reference first to the block diagram of FIG. 2.

The measurement apparatus of the present invention includes a central processor (CPU) 11 for controlling the various circuits that constitute the system and for processing information received from these circuits. The central processor 11 is connected to a motor control unit 12, which consists of a well-known stepping motor control circuit, for driving a pulse motor 13. As will be described in further detail below, the motor control unit 12 produces a pulse motor excitation signal, which is in accordance with the rating of the pulse motor 13, on the basis of a pulsed signal from a pulse oscillator 19 in order to drive the pulse motor 13. Secured to the pulse motor 13 for rotation thereby is a drive shaft 14a having one end of a torsion bar 15 fixedly secured thereto. A disc 16 having a plurality of slits formed in its outer circumferential portion is fixedly secured to the other end of the torsion bar 15, namely to the end connected to a load. The slits partition the disc 16 into alternating light-transmitting and light-shielding portions. A light-emitting element 17a and a light-receiving element 17b are arranged to oppose each other across the disc 16 to detect rotation of the disc based on whether a light beam from the light-emitting element 17a impinges upon or is cut off from the light-receiving element 17b. A phase difference detecting unit 18 detects the phase difference between a pulsed drive signal from the motor control unit 12 for driving the pulse motor 13 and a detection signal from the light-receiving element 17b. The above mentioned pulse oscillator 19 is connected between the motor control unit 12 and the phase difference detecting unit 18 and supplies the former with a 1 KHz clock for the production of excitation pulses to drive the pulse motor 13, and the latter with a 1 MHz clock. An object 20 to be measured is connected to a rotary shaft 14b, which is fixedly secured to the load end of the torsion bar 15. A control panel 21 is connected to the central processor 11 for commanding the operation thereof. A display unit 22 is connected to the central processor 11 for displaying the results of measurement.

Figure 3:
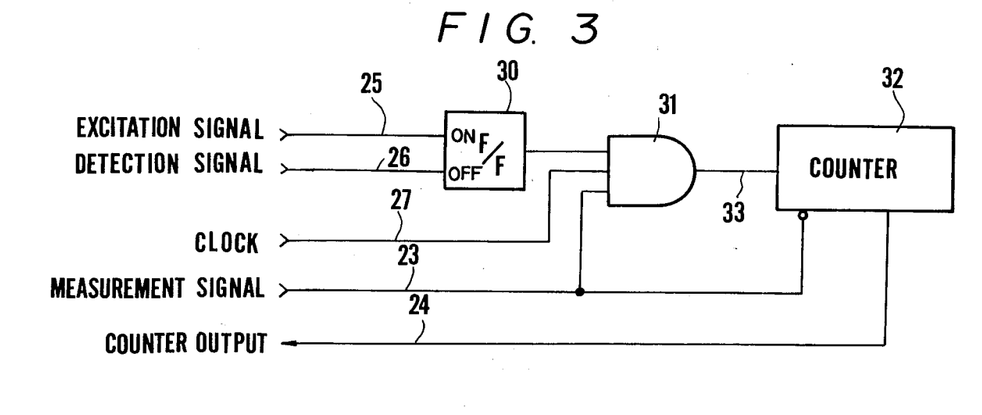
FIG. 3 is a circuit diagram illustrating in detail the construction of a phase difference detecting unit included in the apparatus of FIG. 2.

The details of the phase difference detecting unit 18 are illustrated in FIG. 3. As shown, the phase difference detecting unit 18 comprises a flip-flop (FF) 30, an AND gate 31 which receives the output of FF 30 at one input terminal thereof, and a counter 32 which receives the output of the gate 31. A measurement signal 23 from the central processor 11 is applied to a second input terminal of the gate 31 and to the counter 32, which produces an output signal 24 indicative of the count recorded in the counter. Applied to an ON terminal of the FF 30 is a reference excitation signal 25, which is one phase of the excitation signal delivered from the motor control unit 12 to the pulse motor 13. Any one phase of the excitation signal delivered to the pulse motor 13 will suffice as the reference signal 25. The detection signal 26 produced by the light-receiving element 17b is applied to the OFF input terminal of FF 30. Applied to the third input terminal of the gate 31 is the 1 MHz clock signal, shown at 27, from the pulse oscillator 19.

The FF 30 is set by the leading edge of the excitation signal 25, so that the output thereof goes high, and is reset by the leading edge of the detection signal 26, so that the output thereof goes low. The counter 32 is operable to count the number of clock pulses 27, delivered by the gate 31 while the FF 30 is in the set state, when the measurement signal 23 from the central processor is at the high level.

The operation of the illustrated embodiment will now be described with reference to the timing chart of FIG. 4.

The pulse oscillator 19 supplies the motor control unit 12 with the 1 KHz clock used for the production of excitation pulses to drive the pulse motor 13, and supplies the phase-difference detecting unit 18 with the 1 MHz clock 27 for clocking the counter 32 through the AND gate 31. The motor control unit 12 generates an excitation signal for pulse motor drive based on the 1 KHz clock, with one phase of the excitation signal being delivered as the reference excitation signal 25 to the phase difference detecting unit 18, as set forth above. The signal 25 has a constant period T1.

The disc 16 is partitioned into alternating light-transmitting and light-shielding portions by the above-mentioned slits. When the light beam, which is being constantly produced by the light-emitting element 17a, passes through a light-transmitting portion of the disc 16 and, hence, impinges upon the light-receiving element 17b, the output signal 26 of the latter goes high. By providing the slits in the disc 16 so that they correspond with the angular increments through which the drive shaft 14a of the pulse motor 13 is rotated in response to the excitation signal 25, a constant phase difference will be maintained between the excitation signal 25 and the detection output 26 of the light-receiving element 17b.

In operation, the pulse motor 13 is placed in the unloaded state by being disconnected from the object 20 whose load is to be measured. The pulse motor 13 is then driven into rotation by the motor control unit 12 and the counter 32 counts the number of pulses in the clock signal 27 during the time (T3 in FIG. 4) that the output of the FF 30 is high, namely over the interval of time from the leading edge of the excitation signal 25 to the leading edge of the detection signal 26. The value of the count in counter 32 is representative of the phase difference between the signals 25, 26 in the absence of a load. Let Xa denote the counted value. Next, the object 20 is connected to the pulse motor 13 through the drive shaft 14a, torsion bar 15 and rotary shaft 14b, the pulse motor 13 is driven into rotation by the motor control unit 12 and the counter 32 counts the number of pulses in the clock signal 27 during the time (T3' in FIG. 4) that the output of the FF 30 is high, namely over the interval of time from the leading edge of the excitation signal 25 to the leading edge of the detection signal 26. Now the value of the count in counter 32 represents the phase difference between the signals 25, 26 with the pulse motor 12 in the loaded state. Let Xb denote the counted value.

The value T of the torque ascribable to the load of the object 20 may be calculated from the equation $T = K(Xb - Xa)$ where K represents a coefficient. The phase differences may thus be measured at the period T1.

Let us now describe the foregoing in greater detail for an arrangement in which the object 20 under measurement is a flexible disc, the starting and rotating torques whereof are to be measured.

Figure 5:
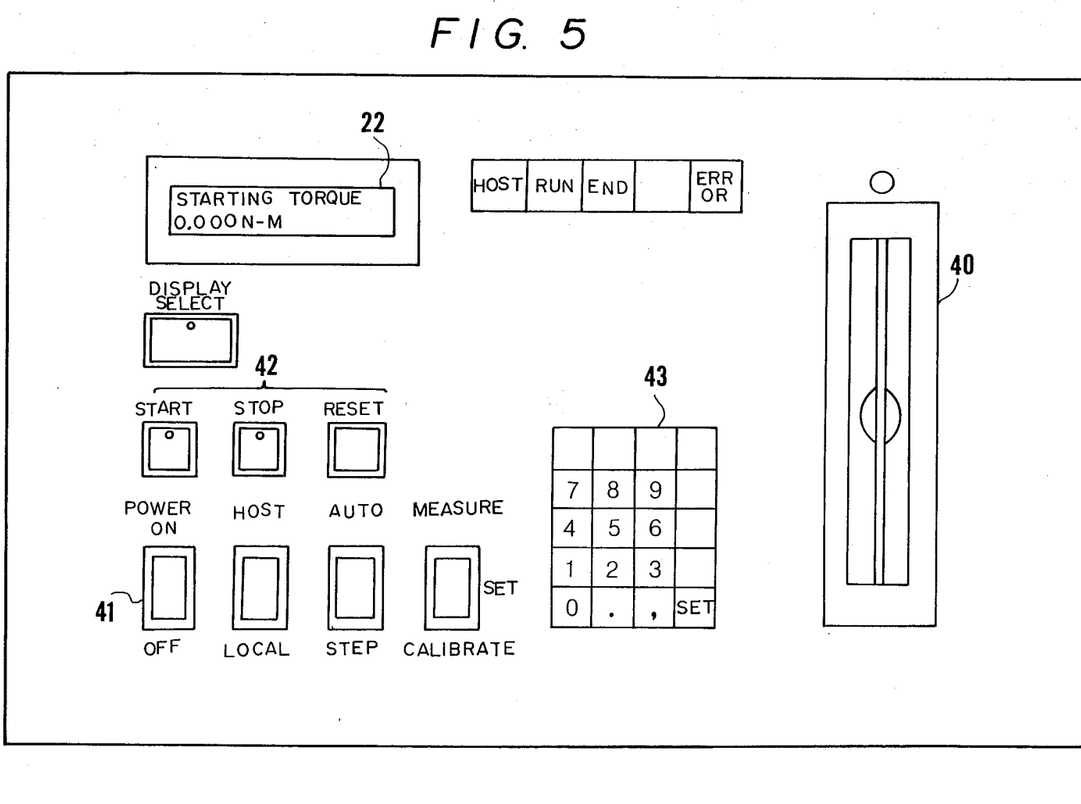
FIG. 5 is a plan view showing the front side of a control panel, in which the apparatus of the preferred embodiment is adapted to measure the load torque of a flexible disc.

FIG. 5 is a plan view showing a control panel of an apparatus for such torque measurement of a flexible disc in accordance with the present invention.

The control panel of FIG. 5 includes the display unit 22 (FIG. 2) which, in the illustrated embodiment, is a dot matrix-type liquid crystal display capable of displaying two rows of characters. The control panel also includes a flexible disc drive (hereafter referred to as an FD unit) 40, a power supply switch 41, control keys 42 and numeric keys 43.

The control sequence for measuring the torque of the flexible disc will now be described with reference to the flowcharts of FIGS. 6(A) through 6(E).

According to the Japanese Industrial Standards (JIS-C6290), the starting torque of a 200 mm-thick flexible disc should not be more than 0.042 N·m in a state where there is no contact between a head and a pressure pad, and the rotating torque of the same disc should range from 0.028 to 0.088 N·m in a state where the pressure pad is pressed against a stipulated position at a pressure of 1.5 N. According to JIS-C6291, the starting torque of a 130 mm-thick flexible disc should not be more than 0.01 N·m under the above-described conditions, and the rotating torque of the same disc should range from 0.01 to 0.03 N·m in a state where the pressure pad is pressed against a stipulated position at a pressure of 0.7 N. Consequently, it is necessary to investigate, by measurement, whether the jacket of the flexible disc meets the above mentioned standards.

Figure 4:
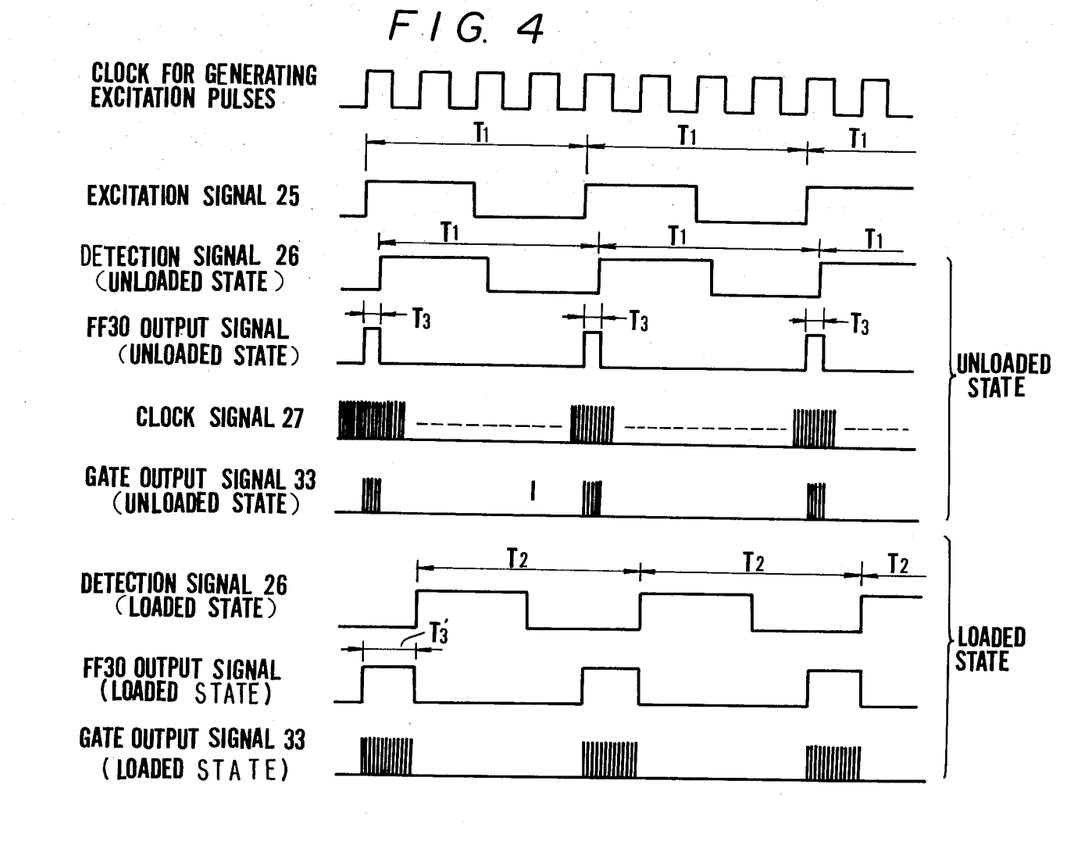
FIG. 4 is a load measurement timing chart according to the present invention.

To this end, according to the illustrated embodiment, the apparatus of FIG. 4 is used to measure the starting torque of the flexible disc, display the results of measurement on the display unit 22, then measure the rotating torque when the pressure pad is not being pressed against the disc, display the results of measurement on the display unit 22, thereafter measure the rotating torque when the pressure pad is being pressed against the disc, and displaying the results on the display unit 22.

Figure 6:
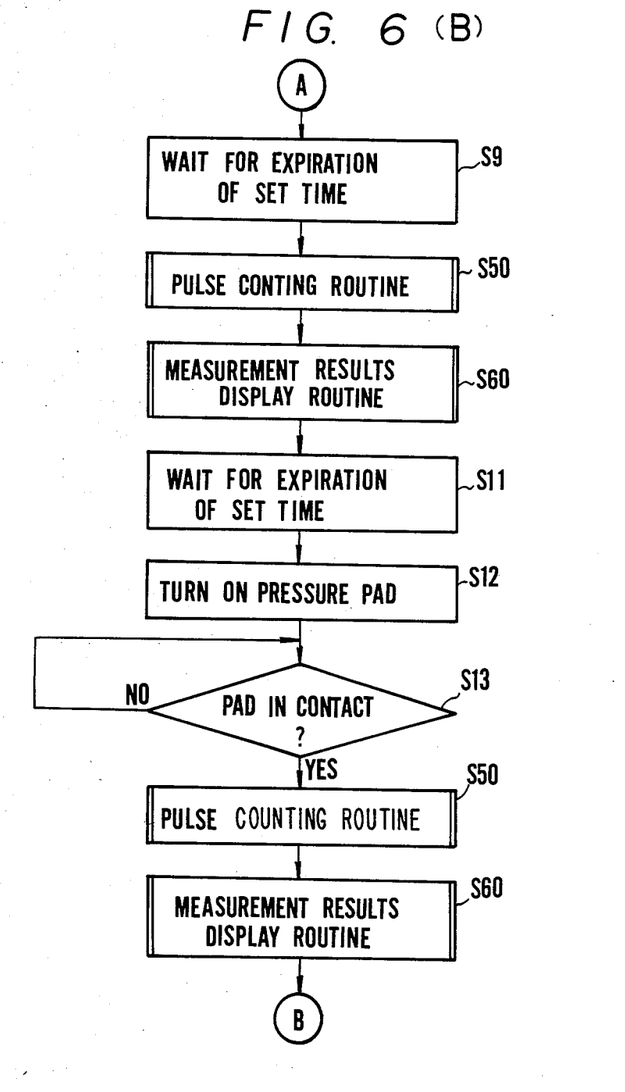
FIGS. 6(A)–6(E) are flowcharts indicating the control sequence for measuring the load torque of the flexible disc.
Figure 6A:
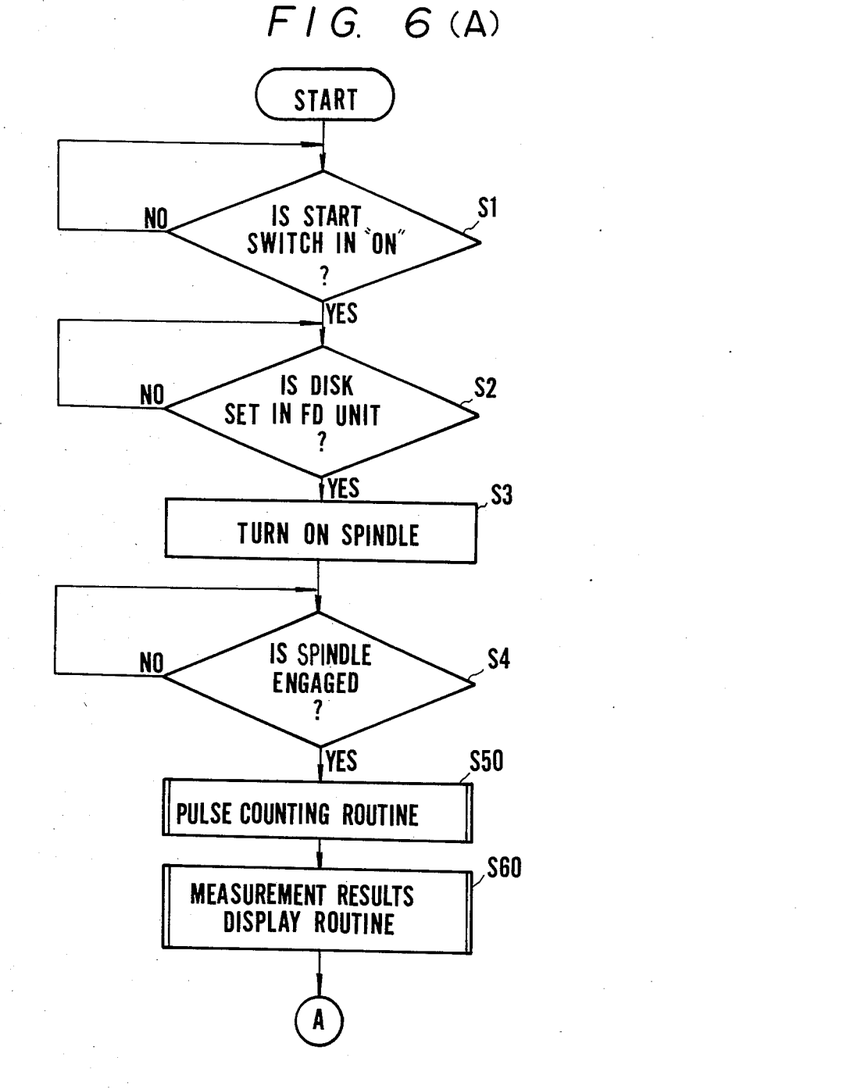
Figure 6C:
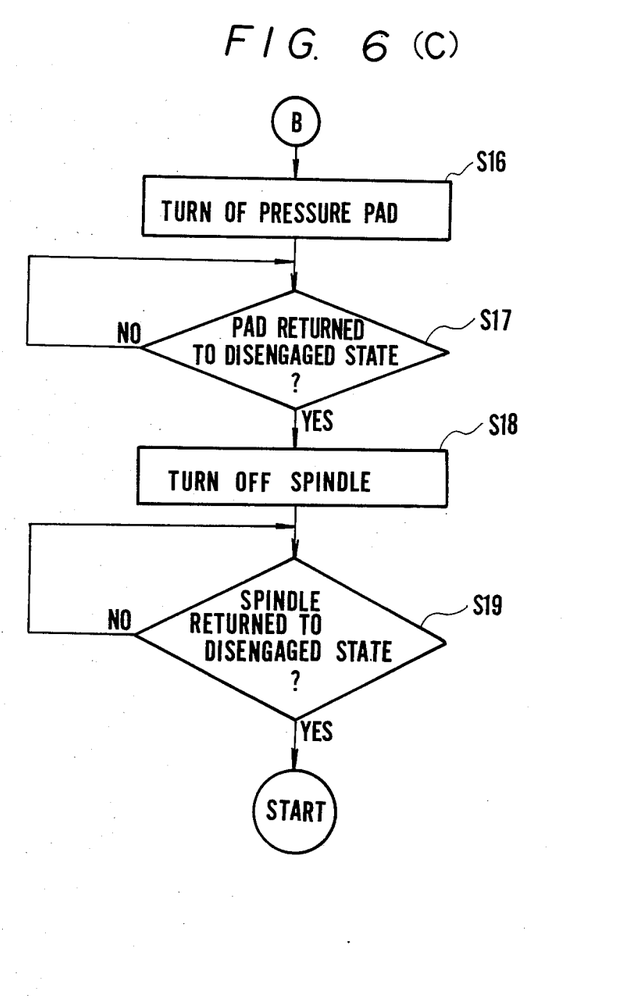

Accordingly, at step S1 of the flowchart of FIG. 6(A) it is determined whether a start switch among the control switches 42 "ON" the control panel 21 is in the on position; if it is, the program proceeds to a step S2, where the system waits for the insertion of the flexible disc in the FD unit 40. When the flexible disc is inserted into the FD unit 40 and the cover of the unit is closed, the program proceeds from the step S2 to the step S3, where the central processor 11 causes the FD unit 40 to turn the spindle on, i.e., to bring the spindle into pressured contact with the disc, and then to a step S4, at which it is determined whether the spindle has been brought into the anticipated engagement with the disc. If the answer at the step S4 is NO, the system waits for the anticipated engagement to be achieved. When a YES decision is rendered at the step S4, the program proceeds to a step S50, at which a pulse counting routine shown in FIG. 6(D) is executed for measuring the starting torque for rotation of the flexible disc.

The first step S51 of the pulse counting routine is to raise the measurement signal 23 to the high logic level and reset a register A within the central processor 11. With the application of the high-level measurement signal 23 to the AND gate 31 and counter 32 of the phase difference detecting unit 18, the counter 32 becomes capable of counting the clock pulses of the clock 27 in the interval from the leading edge of the excitation signal 25 (hereafter referred to as an A-phase clock) to the leading edge of the detection signal 26.

At a step S52, the central processor 11 awaits the A-phase clock from the motor control unit 12 and, when the A-phase clock arrives, proceeds to a step S53 to increment the register A. Next, at a step S54, the central processor 11 determines whether the value recorded in the register is 51. The reason for this is that the pulse motor in the illustrated embodiment is a four-phase 1.8°/P pulse motor and the disc 16 is provided with 50 slits, so that when the A-phase clock arrives 51 times, the drive shaft (disc 16) of the motor will have made one full revolution. If it is found at the step S54 that the value in register A is less than 51 and, hence, that the pulse motor 13 has not made one revolution, the program returns to the step S52. When the status of register A attains the value of 51, the program proceeds from the step S54 to a step S56, where the value (Xb) of the count in counter 32 of the phase difference detecting unit 18 is applied to the central processor 11 and the register A is cleared. Next, at a step S57, the central processor 11 sends the measurement signal 23 to the low logic level to disable the gate 31 and reset the counter 32 in the phase difference detecting unit 18, thereby ending the pulse counting routine and returning the program to a step S60 in the routine of FIG. 6(A).

Figure 6E:
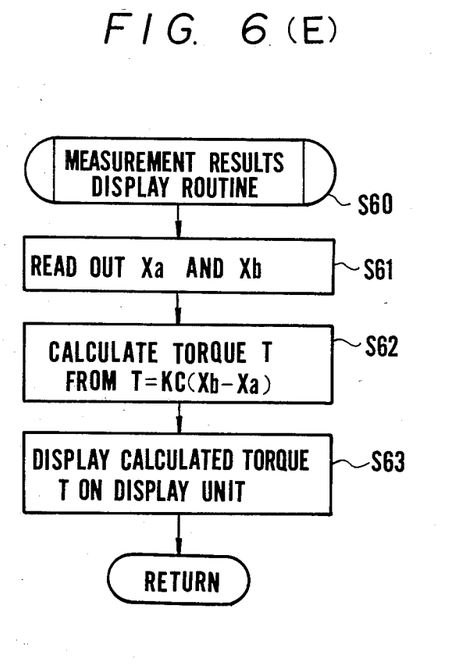

Step S60 is a routine for displaying the results of measurement performed at the immediately preceding step S50. At a step S61 of the display routine, which is shown in FIG. 6(E), the central processor 11 reads the counted value Xb out of the counter 32 for one full revolution of the pulse motor 13 in the loaded state and reads the counted value Xa out of the counter 32 for one full revolution of the pulse motor 13 in the unloaded state (i.e., for one full revolution of the pulse motor 13 without a flexible disc having been inserted in the FD unit 40), which value Xa is obtained in advance. Next, at a step S62, the central processor 11 obtains the torque T at starting time by performing the above calculation $T = K(Xb - Xa)$, and, at a step S63, causes the value of T to be displayed on the display unit 22.

As indicated above, the torque measurement is performed by using the counted value which accumulates in the counter 32 for one full revolution of the pulse motor 13. The reason for this is as follows. When torque measurement is performed in only one phase, a correction ordinarily would have to be be made for every slit in the disc 16. However, by rotating the disc 16 through one revolution, the manufacturing errors possessed by the slits cancel one another so that the load torque can be measured with a high degree of accuracy.

Measurement of starting torque ends when the starting torque obtained is displayed.

Following completion of the routine at the step S60, the program proceeds to a step S9, which calls for the system to wait for a prescribed period of time. This it to confirm display of the results of the starting torque measurement just performed. When the prescribed period of time elapses, the pulse counting routine of step S50 and the display routine of step S60 are executed. Here the flexible disc is rotated in a stable manner and torque is measured and displayed on display unit 22 under a condition in which the pressure pad is not in pressured contact with the disc. Although not stipulated in the Japanese Industrial Standards, the rotating torque is also measured without the pressure pad being brought into pressured contact with the disc in order to investigate the characteristics of the flexible disc jacket.

Next, at a step S11, the system waits for a prescribed period of time, just as at the step S9. Thereafter, a pressure pad mechanism is turned on at a step S12 to drive the pressure pad into pressured contact with the flexible disc. This is followed by a step S13, at which the system waits for the pressure pad to contact the disc. When contact is achieved and the pad is pressed against the flexible disc at the stipulated value, the central processor 11 executes the pulse counting routine of step S50 and then the pulse counting routine of step S50. Thus, the load torque is measured and displayed on the display unit 22 under a condition in which the pressure pad is in pressured contact with the flexible disc.

Next, at a step S16, the pressure pad mechanism is turned off to separate the pressure pad from the flexible disc. It is then verified at a step S17 whether the pressure pad has returned to a disengaged state. If the decision at the step S17 is YES, the program proceeds to a step S18 at which the spindle is taken out of pressured contact with the flexible disc. This is followed by a step S19, at which the system waits for the spindle to return to the disengaged state. When disengagement is achieved, the full series of load torque measurements ends and the program returns to the step S1 to prepare for measurement of the next flexible disc.

In the embodiment described above the disc 16 is provided with a plurality of slits to partition the disc into alternating light-transmitting and light-shielding portions. However, any arrangement that enables the rotational position of the disc to be detected can be adopted. For example, magnetic bodies can be disposed along the outer circumferential portion of the disc and the magnetic bodies can be detected by a detecting element comprising a magnetically sensitive element such as a Hall device.

Since it can be seen that widely different embodiments of the present invention can be made without departing from the spirit and scope thereof, it is to be understood that the invention is not limited to the specific embodiments thereof except as defined in the appended claims.

What is claimed is:

1. An apparatus for measuring the magnitude of a load connected to a drive shaft, comprising:
    drive shaft rotating means for intermittently driving the drive shaft into rotation in response to a drive signal of a changing level;
    drive transmission means connecting the drive shaft to the load and rotated by the drive shaft for transmitting rotation of the drive shaft to the load;
    displacement means provided in a section of said drive transmission means for being rotatively displaced by the load by an amount corresponding to the magnitude of the load;
    sensing means for sensing the rotational position of said displacement means on a side thereof at which said transmission means is connected to the load, and for producing an output signal indicative of said rotational position;
    phase difference detecting means for detecting a phase difference between the output signal of said sensing means and the drive signal; and
    calculating means for calculating the magnitude of the load based on the phase difference detected by said phase difference detecting means.

2. The apparatus according to claim 1, wherein said displacement means comprises a torsion bar.

3. The apparatus according to claim 1, wherein said drive shaft rotating means comprises a pulse motor, and a pulsed output signal produced by said sensing means is generally synchronized to said drive signal.

4. The apparatus according to claim 1, wherein said sensing means comprises a disc fixedly secured to said drive transmission means, and means for sensing rotation of said disc and for producing a pulsed output signal corresponding to the amount of said rotation.

5. The apparatus according to claim 4, wherein said disc includes alternating light-transmissive and light-shielding portions, and said means for sensing rotation of said disc comprises a light-emitting element and a light-receiving element arranged to oppose each other across said disc in such a manner that light from said light-emitting element impinges upon said light-receiving element through the light-transmissive portions of said disc, said means sensing the rotation of said disc based on a change in the amount of light impinging on said light-receiving element.

6. The apparatus according to claim 1, wherein said phase difference detecting means has means for accumulating the detected phase difference over at least one full revolution of the drive shaft, and said calculating means is adapted to calculate the magnitude of the load on the basis of said phase difference detected over at least one full revolution of the drive shaft.

* * * * *